US010452462B2

(12) United States Patent
Oravivattanakul et al.

(10) Patent No.: US 10,452,462 B2
(45) Date of Patent: *Oct. 22, 2019

(54) PARSING COMPLEX LOG ENTRY TYPES

(71) Applicant: salesforce.com, inc., San Francisco, CA (US)

(72) Inventors: Choapet Oravivattanakul, San Francisco, CA (US); Alex Warshavsky, Walnut Creek, CA (US); Samarpan Jain, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/481,641

(22) Filed: Apr. 7, 2017

(65) Prior Publication Data
US 2018/0293253 A1 Oct. 11, 2018

(51) Int. Cl.
*G06F 17/30* (2006.01)
*G06F 11/07* (2006.01)

(52) U.S. Cl.
CPC .................. *G06F 11/0787* (2013.01)

(58) Field of Classification Search
CPC .............. G06F 16/211; G06F 16/2358; G06F 16/2393; G06F 9/542; G06F 11/0787; G06F 17/30144; G06F 17/30112; G06F 17/2705; G06F 17/30221; G06F 17/30294
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

U.S. Appl. No. 13/986,251, filed Apr. 16, 2013.

*Primary Examiner* — Greta L Robinson
(74) *Attorney, Agent, or Firm* — Dergosits & Noah LLP; Todd A. Noah (57) ABSTRACT

System parses fields in a log entry, corresponding to a system user event, to identify a log code for a first and second log entry types. System identifies a common schema for the first and second log entry types. System identifies a schema identifier by applying the common schema to the log entry. The schema identifier corresponds to a schema in a container for the first log entry type or a container for the second log entry type. The container for the first log entry type includes the common schema and a first schema that is specific to the first log entry type. The container for the second log entry type includes the common schema and a second schema that is specific to the second log entry type. System identifies log data by using the corresponding schema to parse fields in the log entry, and outputs the log data.

20 Claims, 6 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0063078 A1* | 3/2016 | Wang ............ G06F 17/40 707/602 |
| 2016/0246849 A1* | 8/2016 | Frampton ......... G06F 16/2455 |
| 2017/0075922 A1* | 3/2017 | Torman .......... G06F 16/1805 |
| 2018/0293258 A1* | 10/2018 | Oravivattanakul ..... G06F 9/542 |

* cited by examiner

PARSING COMPLEX LOG ENTRY TYPES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A computing system can serve multiple users by executing software applications. An event can be when a system user uses an application, such as logins to and logouts from an application, page requests/loads/views, record accesses, file and report downloads and exports, clicks on an application's user interface button, and uses of corresponding application programming interfaces (APIs). The system can respond to such events by generating data that is saved in log files. For example, if a user's client device downloads a file, a system logger stores a corresponding log entry in a log file. The log entry can include data such as a user identifier, a download event type, a timestamp when the download occurred, the name of the downloaded file, and internal system information, such as the bandwidth used by the system to provide the download. If another client of another user logs into the application, the logger can store a new log entry in a log file. For example, if a client logs into an application, the logger stores a new log entry in the same log file or in another log file. The new log entry can include data such as the user identifier, a login event type, a geographic location from which the client logged into the application, a timestamp when the login occurred, and internal system information, such as a server load associated with the login.

A system administrator can use log files to understand the activities of the system and to debug problems. Some end users may want to view some of the data in the log files to perform their own data analysis. For example, a company's director is interested in the log data related to logins, downloads, and user interface clicks, in order to analyze how and where the company's employees are accessing their applications, what the employees are downloading, and what features are being used by the employees. Therefore, the system parses through a log file generated for an application, identifies log data for the system administrator, and identifies end user-facing log data for some of the users. For example, the director maps the geographical locations from where the employees' clients are downloading files, and identifies a problem by determining that a confidential file was downloaded to an unsecure location.

Since a logger, or loggers, use different schemas to generate different log entries for different applications, the schemas may be analyzed to derive each schema for each log entry type. A schema and metadata refer to the same enity or concept in this disclosure. For example, a system administrator analyzes the system's schemas to derive a customer relationship management (CRM) schema, which is identified by a CRM log code in a log entry, and which a CRM logger uses to generate CRM log entries for a CRM application. When a system user requests specific CRM data, a log processor identifies log entries that include the CRM log code, uses the derived CRM schema to determine that the requested CRM data is located at the $5^{th}$ location of a delimited text data format (such as comma separated values) in each identified CRM log entry, extracts the requested CRM data from the $5^{th}$ location of the identified CRM log entries, and outputs the requested CRM data to the system user.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

An application's developer may modify the application's logger to generate different log entry types for the same application. For example, a user interface (UI) application's developer modifies a UI logger to generate UI page view log entries and UI error log entries for the UI application. A system administrator can analyze the system's schemas to derive a UI page view schema and a UI error schema, which are both identified by the UI log code that was used to identify the previous UI schema. If a system user requests UI data, and the log processor identifies a log file's entries that includes the UI log code, each identified log file entry will be either a UI page view log entry or a UI error log entry. Since each log entry does not include the schema that is needed to identify data in the log entry, the log processor would be unable to determine whether to apply the UI page view schema or the UI error schema to any identified UI log entry. Since the log processor cannot determine the location of the requested data in any identified UI log entry, the log processor cannot extract the requested UI data or output the requested UI data to the system user.

Systems and methods are provided for complex log entry type schemas and parsing complex log entry types. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Mechanisms and methods for complex log entry type schemas and parsing complex log entry types will be described with reference to example embodiments. The following detailed description will first briefly describe overviews of methods for complex log entry type schemas and parsing complex log entry types.

In accordance with embodiments described herein, there are provided systems and methods for complex log entry type schemas. A system derives a first schema that is specific to a first log entry type associated with a log code, derives a second schema that is specific to a second log entry type associated with the log code, and derives a common schema for the first log entry type and the second log entry type. The system stores the first schema and the common schema in a container for the first log entry type, and stores the second schema and the common schema in a container for the second log entry type. The system identifies a schema identifier in a log entry that corresponds to a system user event. The schema identifier corresponds to a schema in the container for the first log entry type or the container for the second log entry type. The system identifies log data by applying the corresponding schema to the log entry, and outputs the log data.

For example, since the UI log code corresponds to both a UI page view log entry and a UI error log entry, the system derives a UI page view schema that is specific to a UI page view log entry, derives a UI error schema that is specific to a UI error log entry, and derives a UI common schema that is shared by both a UI page view log entry and a UI error log entry. The system stores the specific UI page view schema and the shared UI common schema as metadata in a UI page view metadata container, and stores the specific UI error schema and the shared UI common schema as metadata in a UI error metadata container. The system identifies a UI page view schema identifier in a UI log entry that was generated when a system user selected a UI element while viewing a page. The system applies the specific UI page view schema from the UI page view metadata container to the UI log entry to thereby identify and output log data that identifies the selected UI element and its timestamp.

In accordance with embodiments described herein, there are provided systems and methods for parsing complex log entry types. A system parses fields in a log entry to identify a log code for a first log entry type and a second log entry type. The log entry corresponds to a system user event. The system identifies a common schema for the first log entry type and the second log entry type. The system applies the common schema to the log entry to identify a schema identifier that corresponds to a schema in a container for the first log entry type or a container for the second log entry type. The container for the first log entry type includes the common schema and a first schema that is specific to the first log entry type. The container for the second log entry type includes the common schema and a second schema that is specific to the second log entry type. The system uses the corresponding schema to parse fields in the log entry to identify and output the log data.

For example, the system parses a UI log entry to identify a UI log code that identifies both a UI page view log entry and a UI error log entry. The UI log entry was generated when a system user selected a UI element while viewing a page. The system identifies a UI common schema for a UI page view log entry and a UI error log entry. The system applies the UI common schema to the UI log entry to thereby identify a UI page view schema identifier, which corresponds to a UI page view schema in a metadata container for a UI page view log entry. The container for a UI page view log entry includes a specific UI page view schema for a UI page view log entry and the UI common schema. A container for a UI error log entry includes a specific UI error schema for a UI error log entry and the UI common schema. The system uses the UI page view schema to parse fields in the UI log entry to thereby identify and output log data that identifies the selected UI element and its timestamp.

While one or more implementations and techniques are described with reference to an embodiment in which complex log entry type schemas and parsing complex log entry types are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
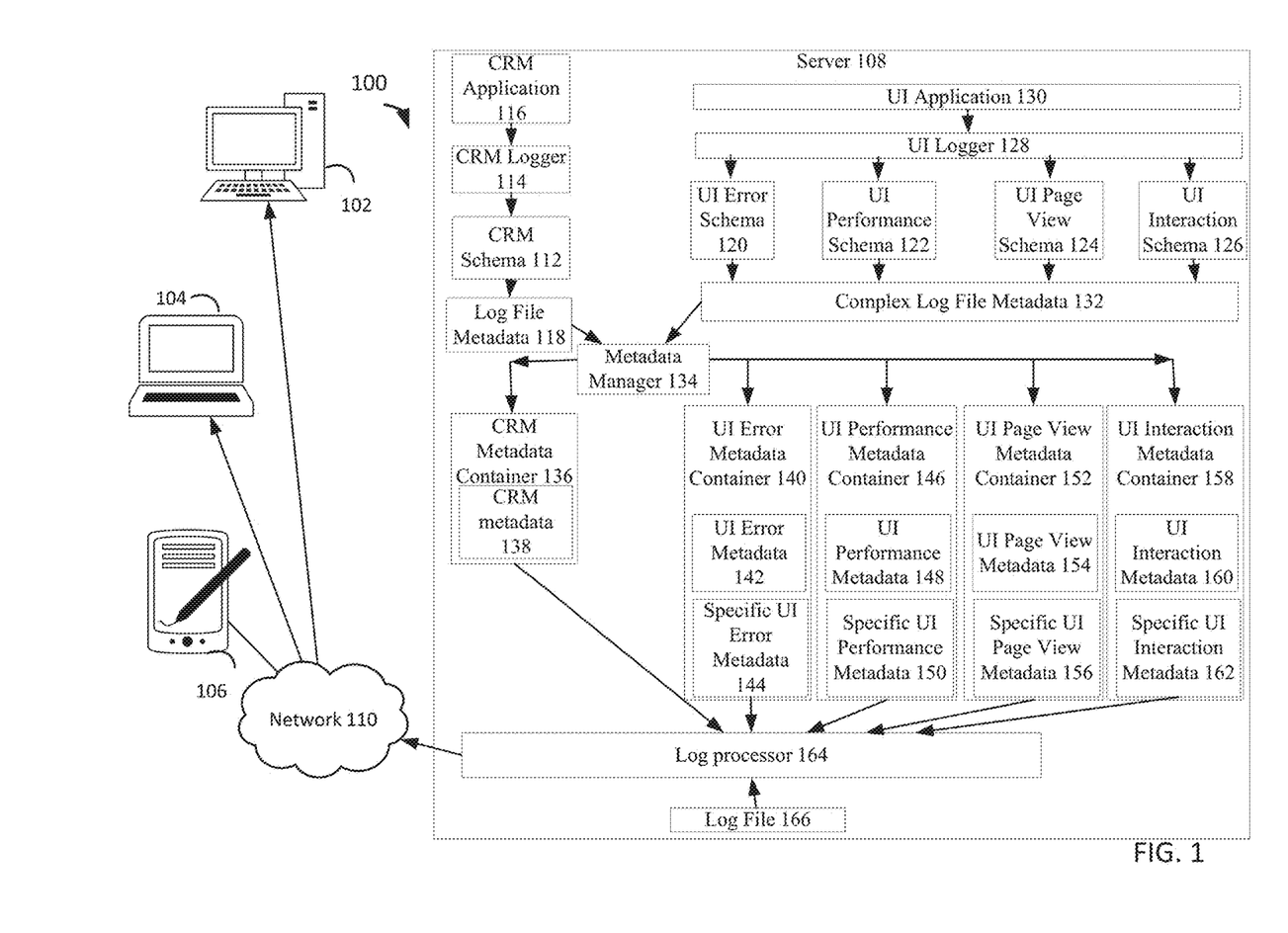
FIG. 1 illustrates an example system for complex log entry type schemas, in an embodiment.

FIG. 1 depicts an example of a system for complex log entry type schemas, in an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108, that may be provided by a hosting company. Although FIG. 1 depicts the first client 102 as a desktop computer 102, the second client 104 as a laptop computer 104, and the third client 106 as a mobile phone 106, each of the clients 102-106 may be any type of computer. The clients 102-106 and the server 108 communicate via a network 110. Although FIG. 1 depicts the system 100 with three clients 102-106, one server 108, and one network 110, the system 100 may include any number of clients 102-106, any number of servers 108, and any number of networks 110. The clients 102-106 and the server 108 may be substantially similar to the systems depicted in FIGS. 5-6 and described below.

The system 100 analyzes a CRM schema 112, which is used by a CRM logger 114 to generate logs for a CRM application 116, to derive a schema that is stored as log file metadata 118. The system 100 also analyzes a UI error schema 120, a UI performance schema 122, a UI page view schema 124, and a UI interaction schema 126, which are used by a UI logger 128 to generate logs for a UI application 130, to derive a common schema and specific schemas that are stored as complex log file metadata 132. The CRM logger 114 and the UI logger 128 may be separate loggers or the same logger. The system 100 can use a metadata creator, a system component which is not depicted, to automatically analyze the schemas 112 and 120-126, which are used by the loggers 114 and 128, to derive the schemas stored as metadata 118 and 132. Alternatively, the metadata creator may be a system administrator using one of the clients 102-106 to manually analyze schemas, which are used by loggers, to derive schemas stored as metadata, or any combination of the metadata creator system component and the metadata creator system administrator can analyze schemas, which are used by loggers, to derive schemas stored as metadata. Although FIG. 1 depicts the elements 112-132 as residing on the server 108 that includes a metadata manager 134, any combination of the elements 112-132 may reside partially on any combination of the server 108, any other servers that are not depicted, and/or the clients 102-106.

The server 108 includes a CRM metadata container 136 that stores CRM metadata 138, a UI error metadata container 140 that stores UI error metadata 142 and specific UI error metadata 144, and a UI performance metadata container 146 that stores UI performance metadata 148 and specific UI performance metadata 150. The server 108 further includes a UI page view metadata container 152 that stores UI page view metadata 154 and specific UI page view metadata 156, and a UI interaction metadata container 158 that stores UI interaction metadata 160 and specific UI interaction metadata 162. The metadata manager 134 creates the metadata containers 136, 140, 146, 152, and 158, based on an application release version, an event log type, and/or a log code, to store the metadata managed by the metadata manager 134. The metadata containers 136, 140, 146, 152, and 158 provide metadata 138, 142, 148, 154, and 160 and specific metadata 144, 150, 156, and 162 to a log processor 164 that outputs log data from a log file 166 to any of the clients 102-106.

Figure 2:
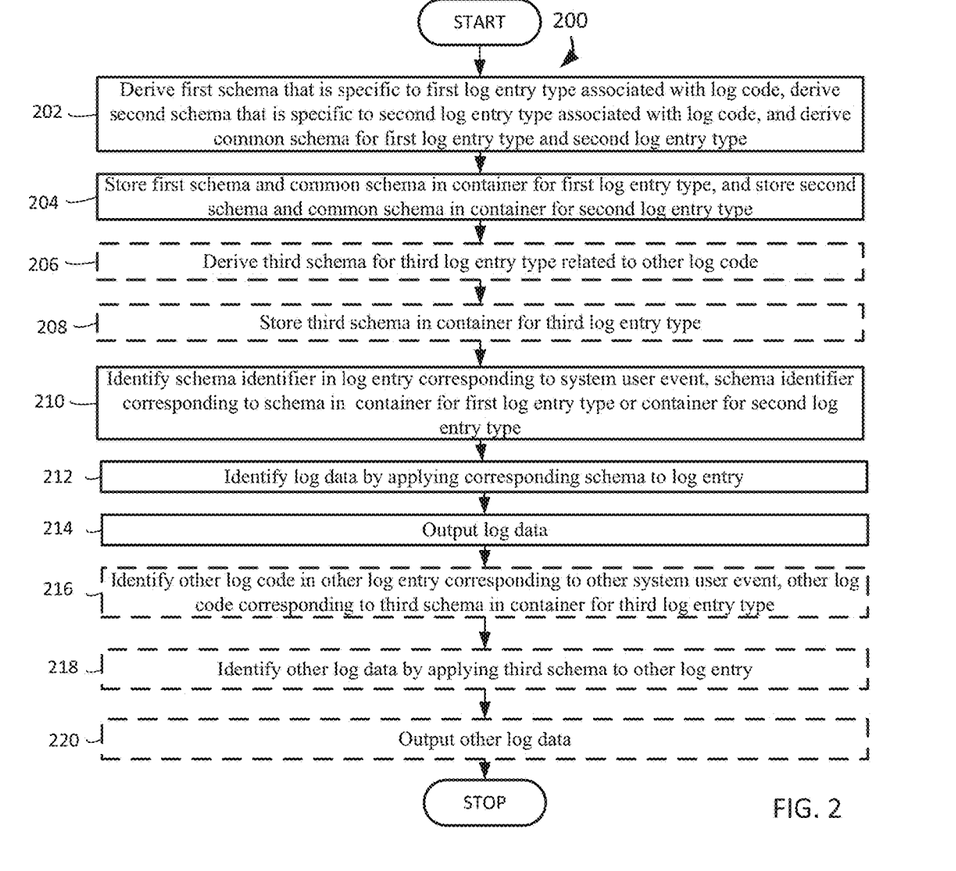
FIG. 2 is an operational flow diagram illustrating a high level overview of a method for complex log entry type schemas, in an embodiment.

FIG. 2 is an operational flow diagram illustrating a high level overview of a method 200 for complex log entry type schemas. The following examples are based on a log entry that includes a log code which identifies a log entry type, which is used to select the corresponding schema that is used to identify information in the remainder of the log entry. For example, the log code "CRM" in a log entry identifies the log entry as a CRM log entry, which corresponds to the previously stored CRM schema that may be used to identify field names and field values in the CRM log entry.

A first schema is derived that is specific to a first log entry type related to a log code, a second schema is derived that is specific to a second log entry type related to the same log code, and a common schema is derived for the first log entry type and the second log entry type, block 202. The system uses various schemas that are derived for various log entry types to subsequently output log data from log entries. For example and without limitation, since the UI log code can be used to identify a UI page view log entry, a UI error log entry, a UI performance log entry, and a UI interaction log entry, this can include a metadata creator deriving schemas and specific schemas for these log entry types from the UI error schema 120, the UI performance schema 122, the UI page view schema 124, and the UI interaction schema 126. The schemas 120-126 may be in the Apache Avro format, or in any other format. The metadata creator derives a UI page view schema that is specific to a UI page view log entry, derives a UI error schema that is specific to a UI error log entry, derives a UI performance schema that is specific to a UI performance log entry, and derives a UI interaction schema that is specific to a UI interaction log entry, after deriving a UI common schema that is shared by a UI page view log entry, a UI error log entry, a UI performance log entry, and a UI interaction log entry. A schema can be a modeled representation of an entity. A subtype schema can be a modeled representation of an entity's subdivision, which has a child-to-parent relationship with the entity. A log entry type can be a category of an item in a record of events. A log code can be a symbol, which represents other entities, in a record of events. A common schema can be a modeled representation that is used by multiple entities.

Below is an example of a UI common schema.

```
<event-log-file>
    <version>206.0</version>
    <event>
        <name>USER_INTERFACE_EVENT</name>
        <code>UI</code>
        <hasSubType>true</hasSubType>
        <fieldList>
            <field>
                <name>CLIENT_ID</name>
                <type>String</type>
                <isInternal>false</isInternal>
                <hasSubTypeName>false</hasSubTypeName>
                <hasSubTypeData>false</hasSubTypeData>
            </field>
            <field>
                <name>SCHEMA_ID</name>
                <type>String</type>
                <isInternal>true</isInternal>
                <hasSubTypeName>true</hasSubTypeName>
                <hasSubTypeData>false</hasSubTypeData>
            </field>
            <field>
                <name>PAYLOAD</name>
                <type>String</type>
                <isInternal>true</isInternal>
                <hasSubTypeName>false</hasSubTypeName>
                <hasSubTypeData>true</hasSubTypeData>
                <subTypeDataFormat>JSON</subTypeDataFormat>
            </field>
        </fieldList>
    </event>
</event-log-file>
```

In this example, "<code>UI<code>" identifies the common schema as corresponding to a UI log entry type, and <hasSubType>true</hasSubType>indicates that the schema has subtype fields. A subtype field can be an entity's subdivision of a record, and represent an item of data. This common schema identifies three fields that are common for all UI log entry types, "CLIENT_ID," "SCHEMA_ID," and "PAYLOAD." "SCHEMA_ID" identifies a field in a log entry. For example, if the value of this field is "schemaid-123," then a subtype schema that lists "schemaid-123" as its subtype will be chosen to as the corresponding subtype schema for parsing the remainder of the corresponding log entry. While this example describes "PAYLOAD" as having subtype data in the JSON format, which is multi-hierarchical, the subtype data may be in any format. The system selects the appropriate subtype handler and stream parser, which are described below, based on the subtype data format specified in the common schema. For example, since "PAYLOAD" has subtype data in the JSON format, the system selects a JSON subtype handler and a JSON stream parser to extract JSON subtype fields.

Below is an example of a UI page view subtype schema that is specific to a UI page view log entry.

```
<event-log-file-subtype>
<version>206.0</version>
<event-subtype>
    <parentName>USER_INTERFACE_EVENT</parentName>
    <name>USER_INTERFACE_PAGE_VIEW_EVENT</name>
    <subType>schemaid-123</subType>
    <fieldList>
        <field>
            <name>PAGE_START_TIME</name>
            <type>Long</type>
            <isInternal>false</isInternal>
            <location>$.pageStartTime</location>
        <field>
        <field>
            <name>TARGET_UI_ELEMENT</name>
            <type>String</type>
            <isInternal>false</isInternal>
            <location>$.locator.target</location>
        <field>
        <field>
            <name>UI_EVENT_TIMESTAMP</name>
            <type>Long_Double</type>
            <isInternal>false</isInternal>
            <location>$.ts</location>
        <field>
    </fieldList>
</event-subtype>
</event-log-file-subtype>
```

This example subtype schema lists "USER_INTERFACE_PAGE_VIEW_EVENT" as a child of the parent "USER_INTERFACE_EVENT." This child-parent relationship indicates that when a log entry includes the UI log code that corresponds to the parent "USER_INTERFACE_EVENT," further processing is required to determine which child of the parent has the subtype schema to identify the subtype fields in the log entry. The parent name field in a subtype schema corresponds to the name field in the corresponding common schema. This example subtype schema also lists the subtype fields named "PAGE_START_TIME," "TARGET_UI ELEMENT," and "UI_EVENT_TIMESTAMP" and their corresponding locations. The location of "TARGET_UI_ELEMENT" is listed as $.locator.target, which is a nested hierarchy format, which requires the identification of the location "locator," and then the identification of the location "target" that is nested beneath the location "locator." If a field in a log entry that the system is trying to extract has a null value, the system will output an empty string regardless of the field "type."

The examples of the common schema and the subtype schema each include "<version>206.0</version>," which references an application release version number. With each new release version of an application, existing log entry fields may be moved, new log entry fields may be added, or existing log entry fields may be removed. As such, when the log processor 164 processes a log entry to identify log data, it is possible that the schema for the log entries changed for the new release version and, as a result, it is possible that the log processor 164 incorrectly identifies log data. If a new release version of an application changes the position of a field in a log entry, it is possible that all of the resulting fields in the log entry would be offset by one column. For example, the "User Identifier" field may be in the position where the "IP Range" field was previously located. As a result, when a user views the log data, instead of viewing an expected IP Range such as 10.0.0.1, the user would see an user identifier such as 00530000004NOSO. Additionally, if a field is removed from a log entry, it is possible that the field's position may be used by another field. For example, if the "IP Range" field is removed, the corresponding position may then be used by the "User Agent" field, resulting in the log processor 164 incorrectly identifying log data for a system user.

Therefore, the system 100 can provide instructions for the log processor 164 to process the log files 166 according to a particular release version of an application. As an example, the log processor 164 receives schemas derived from a versioned log metadata file that contains instructions for how to process an application's log files for a particular release version of the application in order to identify log data having a particular set of log entries and log entry fields that are designated by the versioned log metadata file. For example, the versioned log metadata file may indicate the names and positions of the log entry fields. The log processor 164 then uses schemas derived from this versioned log metadata file to determine how to process an application's log files that the log processor 164 receives.

Consequently, the log processor 164 may be agnostic of any change in the log metadata file from release version to release version. The system 100 may introduce release versions that may be used to derive the schemas and maintain the integrity of the resulting log files 166. Because the parsing of log entries is performed in an automated fashion, during a release cycle, a new version of the log metadata file may be introduced so that log data is correctly and automatically identified by the log processor 164 processing the application's log files. The introduction of versioning also enables developers to continue to move, add, or remove fields without having negative consequences on the log data provided to users.

The log metadata file may be automatically generated based on log entry definition metadata provided by a developer for each release version of an application. The log entry definition metadata may be provided in a log entry definition file. The log entry definition file may contain a description of different types of log entries that may appear in an application's log files for the respective release version of the application, as well as the particular fields that appear in each type of log entry. The log metadata file may be generated based on the log entry definition file. The log entry definition file may also indicate which log entry types and fields are approved by a system administrator for being provided to end users.

Having derived various schemas, the first schema and the common schema are stored in a container for the first log entry type, and the second schema and the common schema are stored in a container for the second log entry type, block 204. The system stores various schemas as metadata in various metadata containers that are accessed for subsequently outputting log data from log entries. By way of example and without limitation, this can include the metadata manager 134 storing the specific UI page view schema as the specific UI page view metadata 156 in the UI page view metadata container 152, and storing the UI common schema as the UI page view metadata 154 in the UI page view metadata container 152. In another example, the metadata manager 134 stores the specific UI error schema as the specific UI error metadata 144 in the UI error metadata container 140, and stores the UI common schema as the UI error metadata 142 in the UI error metadata container 140. In yet another example, the metadata manager 134 stores the specific UI performance schema as the specific UI performance metadata 150 in the UI performance metadata container 146, and stores the UI common schema as the UI performance metadata 148 in the UI performance metadata container 146. In an additional example, the metadata manager 134 stores the specific UI interaction schema as the specific UI interaction metadata 162 in the UI interaction metadata container 158, and stores the UI common schema as the UI interaction metadata 160 in the UI interaction metadata container 158. When the metadata manager stores a schema as metadata, the metadata manager 134 serializes the schema from a file, such as an XML file, into a metadata object. A container can be an object that stores entities.

After storing schemas as metadata, a third schema is optionally derived for a third log type related to another log code, block 206. The system can still derive schemas for log types that do not include subtype fields. In embodiments, this can include the metadata creator deriving a schema from the CRM schema 112 for a CRM log entry.

Once the third schema is derived, the third schema is optionally stored in a container for the third log type, block 208. The system stores various schemas in various metadata containers that are accessed for subsequently outputting log data from log entries. For example and without limitation, this can include the metadata manager 134 storing the schema for a CRM log entry as the CRM metadata 138 in the CRM metadata container 136.

Following the storage of various schemas as metadata for various event log types, a schema identifier is identified in a log entry that corresponds to a system user event, the schema identifier corresponding to a schema in the container for the first log entry type or the container for the second log entry type, block 210. The system uses the schema identifier to identify the schema needed to output log data from the log entry. By way of example and without limitation, this can include the log processor 164 identifying the log code "UI" and the schema identifier "schemaid-123" in a UI log entry from the event log file 166. The UI logger 128 generated the UI log entry as a UI page view log entry when a system user selected a UI element while viewing a page. Since the specific UI page view metadata 156 in the UI page view metadata container 152 includes "<subtype>schemaid-123<subtype>," the log processor 164 selects the specific UI page view metadata 156 for applying to the UI log entry's fields. A schema identifier can be one or more symbols used to refer to a modeled representation of an entity or an entity's subdivision. A log entry can be an item in a record of events. A system user event can be a single occurrence of a person operating a part of a computer.

Once a schema identifier is identified, log data is identified by applying the corresponding schema to the log entry, box 212. The system uses a schema to identify log data that is subsequently output from a log entry. In embodiments, this can include the log processor 164 applying the specific UI page view schema, which was stored as the specific UI page view metadata 156, to the UI log entry to identify log data that identifies the selected UI element and its timestamp. Log data can be information in a record of events.

After log data is identified, the log data is output, box 214. The system outputs log data from the log entry. For example and without limitation, this can include the log processor 164 outputting data that identifies the selected UI element and its timestamp.

Following the storing of various schemas as metadata for various log types, another log code is optionally identified in another log entry corresponding to another system user event, the other log code corresponding to another schema in the container for the third log entry type, block 216. The system uses the log code to identify the log type's schema needed to output log data from the other log entry. By way of example and without limitation, this can include the log processor 164 identifying the log code "CRM" in a log entry from the log file 166. The CRM logger 114 generated the log entry when a system user selected to initiate the CRM application 116. Since the CRM metadata 138 in the CRM metadata container 136 includes "<code>CRM<code>," the log processor 164 selects the CRM schema stored as CRM metadata 136 for applying to the CRM log entry's fields.

Following the identification of the other log type that corresponds to the other schema, the other log data is optionally identified by applying the other schema to the other log entry, block 218. The system can still identify log data from a log entry that does not include subtype fields. In embodiments, this can include the log processor 164 applying the CRM schema, which was stored in the CRM metadata 138, to the CRM log entry to identify the CRM application 116 that was initiated by the system user and the timestamp indicating when the initiation occurred.

After the identification of the log data, the other log data is optionally output, block 220. The system can still output log data from a log entry that does not include subtype fields. For example and without limitation, this can include the log processor 164 outputting data that identifies the CRM application 116 that was initiated by the system user and the timestamp indicating when the initiation occurred.

The method 200 may be repeated as desired. Although this disclosure describes the blocks 202-220 executing in a particular order, the blocks 202-220 may be executed in a different order. In other implementations, each of the blocks 202-220 may also be executed in combination with other blocks and/or some blocks may be divided into a different set of blocks.

An end user may be interested in the log entries related to logins, downloads, and user interface clicks in order to determine how clients are accessing their applications, what the clients are downloading, and what features are being used by the clients. The system administrator may be interested in those log entries as well as application programming interface (API) events. However, the system administrator may not want to provide the log entries associated with the API events to end users because the data may be too detailed, provide specific data regarding the performance of the system, or include other details that the end users do not need. Additionally, some fields of the log entries may also store data that the system administrator does not want to provide to the end users.

The versioned log metadata file may serve as instructions for the log processor 164 to select the appropriate log entries and log fields to be provided to end users. For example, version 1 log files for an application contain log entries generated by version 1 for an application, and the application provides a log metadata file corresponding to version 1 of the application for deriving schemas for the log processor 164. The log processor 164 can utilize the schemas derived from the log metadata file corresponding to version 1 of the application to identify which log entries and which log fields to provide to end users. The log processor 164 may subsequently receive some version 2 log files for a second version of the application. The log processor 164 may also receive schemas derived from a different log metadata file corresponding to version 2 of the application from the application. The log processor 164 may utilize the schemas derived from the different log metadata file to process the version 2 log files received from the application.

As an example, a log file includes over 200 types of log entries generated upon different system user events. However, a system administrator may want the end users to receive log data that corresponds to 28 approved log entry types. For example, log entries corresponding to logins and downloads may be approved, but log entries corresponding to API events may not be approved because these associated log entries are mainly for internal purposes that should not be provided to the end users. Accordingly, the system administrator may designate approved log entries in a file, such as an extensible markup language (XML) data file, with designations or attributions of the approved types of log entries. For each selected log entry, the log processor 164 selects a subset of the data items based on the approved data. Similar to the system administrator designating approved log entries, particular log fields may also be approved, in the same or another XML data file, with designations or attributions of the approved log fields.

Figure 3:
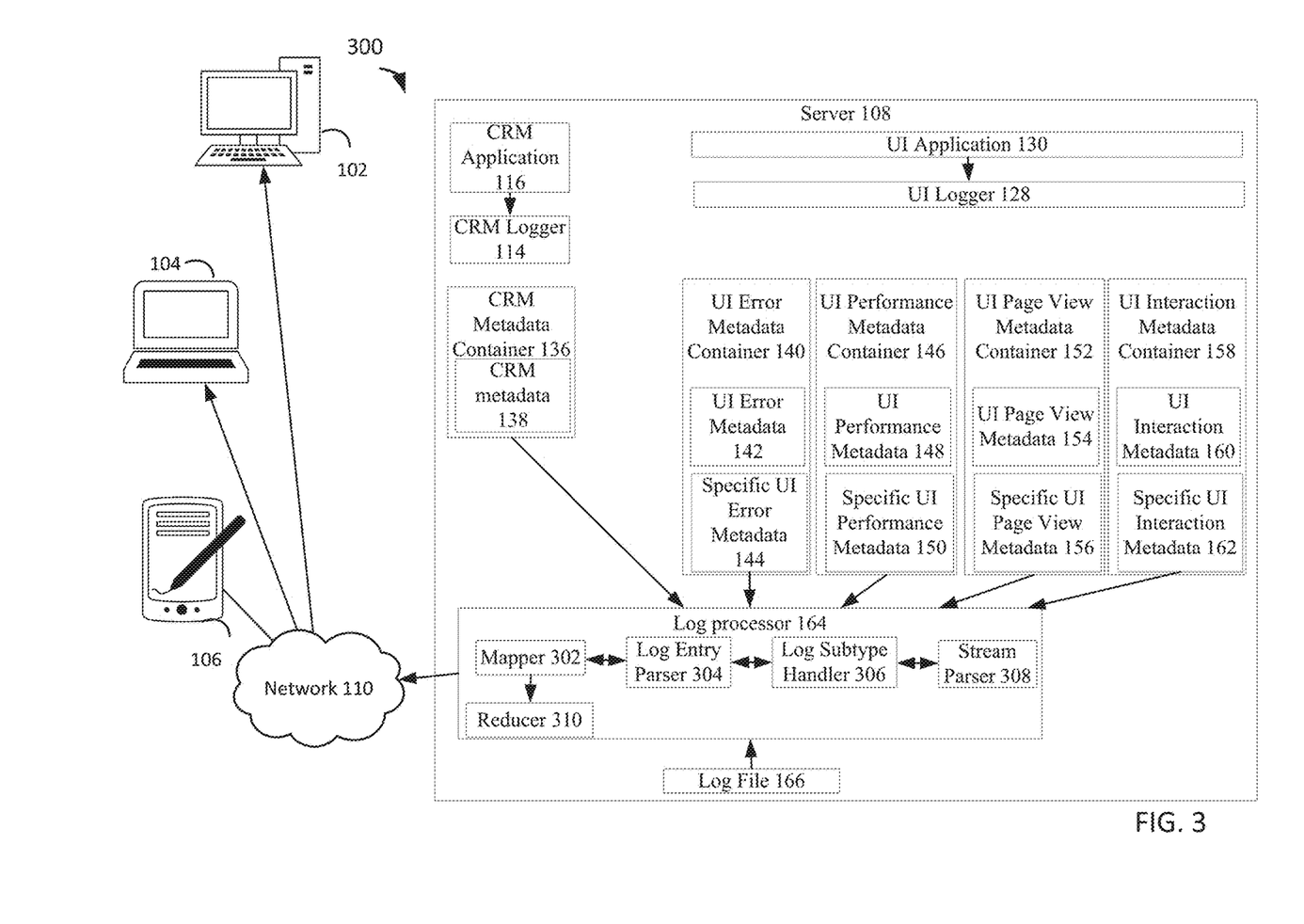
FIG. 3 illustrates an example system for parsing complex log entry types, in an embodiment.

FIG. 3 depicts an example of a system for parsing complex event log entry types, in an embodiment. As shown in FIG. 3, a system 300 includes the elements 102-110, 114, 116, 128, 130, and 136-166 that are depicted in FIG. 1 and described above in reference to FIG. 1. The log processor 164 includes a mapper 302, a log entry parser 304, a log subtype handler 306, a stream parser 308, and a reducer 310. The mapper 302 receives the log file 166, and provides a log entry from the log file 166 to the log entry parser 304.

If a log entry is a CRM log entry, without any subtype fields, the log entry parser 304 parses the CRM log entry to identify the CRM log entry code, then uses the CRM metadata 138 (corresponding to the CRM log entry code) retrieved from the CRM metadata container 136 to identify log data in the CRM log entry, and returns the log data to the mapper 302, which writes the log data to an intermediate storage or to memory. The reducer 310 retrieves the log data from the intermediate storage, and outputs the log data to at least one of the clients 102-106.

When the log entry parser 304 initially parses a log entry and identifies the UI log code, the log entry parser 304 retrieves the UI common metadata 142, 148, 154, or 160 (corresponding to the UI log code) from the UI metadata container 140, 146, 152, or 158, and uses the UI common metadata 142, 148, 154, or 160 to identify a subtype schema identifier in the UI log entry and each subsequent UI log entry. Then the log entry parser 304 determines whether the subtype schema identifier identifies a subtype schema in the specific UI error metadata 144 in the UI error metadata container 140, in the specific UI performance metadata 150 in the UI performance metadata container 146, in the specific UI page view metadata 156 in the UI page view metadata container 152, or in the specific UI interaction metadata 162 in the UI interaction metadata container 158. The log entry parser 304 provides the subtype schema, identified by the subtype schema identifier, and the subtype data stored in the payload field, identified by the UI log entry, to the log subtype handler 306. Next the log subtype handler 306 uses the identified subtype schema to determine a list of pair values of field locations and field types of the fields needed to be extracted, and provides the list of pair values of field locations and field types of the fields needed to be extracted and the subtype data stored in the payload field to the stream parser 308. The stream parser 308 uses the list of pair values of field locations and field types of the fields needed to be extracted to parse the subtype data stored in the payload field to identify log data, and returns the log data to the log subtype handler 306, which returns the log data to the log entry parser 304, which returns the log data to the mapper 302, which writes the log data to an intermediate storage. The reducer 310 retrieves the log data from the intermediate storage, and outputs the log data to at least one of the clients 102-106.

Figure 4:
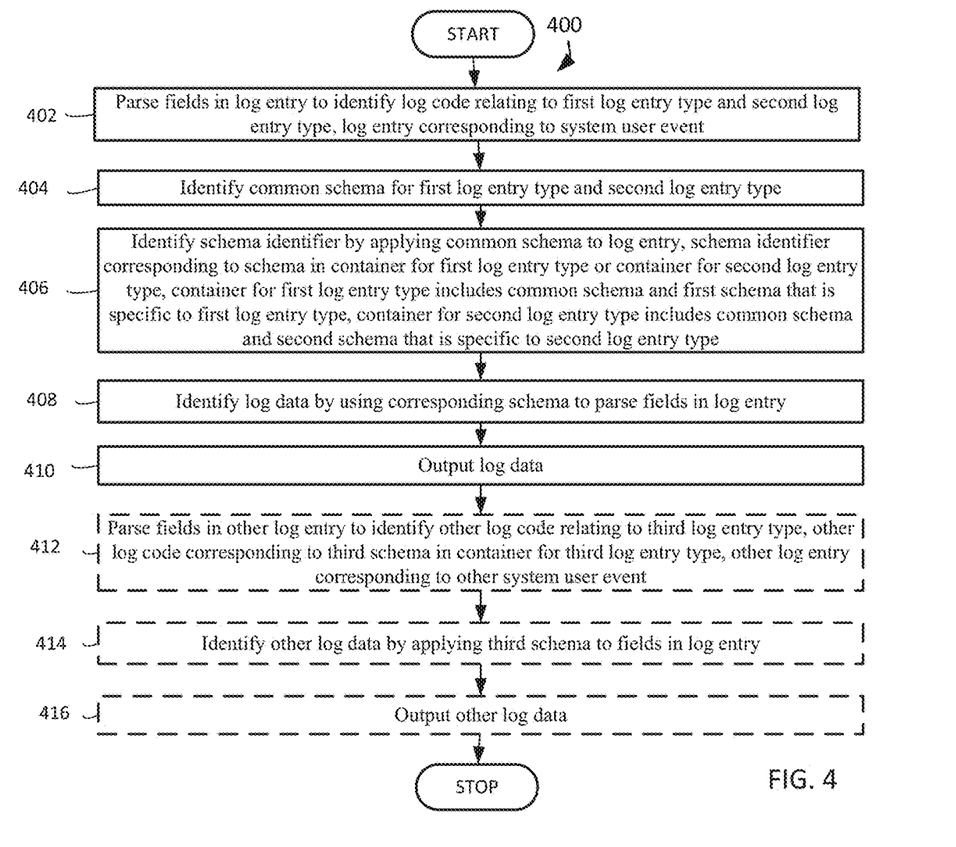
FIG. 4 is an operational flow diagram illustrating a high level overview of a method for parsing complex log entry types, in an embodiment.

FIG. 4 is an operational flow diagram illustrating a high level overview of a method 400 for parsing complex event log entry types. Fields in a log entry are parsed to identify a log code for a first log entry type and a second log entry type, the log entry corresponding to a system user event, block 402. The system parses log entries to identify log codes that are used to identify log data that is subsequently output from the log entries. For example and without limitation, this can include the log entry parser 304 parsing the first field of a UI log entry to identify the UI log code that identifies a UI page view log entry, a UI error log entry, a UI performance log entry, and a UI interaction log entry. The UI log entry was generated when a system user selected a UI element while viewing a page. A field can be a part of a record, and represent an item of data.

Having identified a log code for multiple log entry types, a common schema is identified for the first log entry type and the second log entry type, block 404. The system identifies a common schema for the multiple entry types identified by the log code, and uses the common schema to identify log data that is subsequently output from a log entry. By way of example and without limitation, this can include the log entry parser 304 identifying the UI common schema for the UI log code, which corresponds to a UI page view log entry, a UI error log entry, a UI performance log entry, and a UI interaction log entry, from the UI metadata 142, 148, 154, or 160 from the UI metadata container 140, 146, 152, or 158.

After identifying the common schema, a schema identifier is identified by applying the common schema to the log entry, the schema identifier corresponding to a schema in a container for the first log entry type or a container for the second log entry type, the container for the first log entry type including the common schema and a first schema that is specific to the first log entry type, the container for the second log entry type including the common schema and a second schema that is specific to the second log entry type, block 406. The system identifies a schema that is used to identify log data that is subsequently output from a log entry. In embodiments, this can include the log entry parser 304 applying the UI common schema to the UI log entry to identify "schemaid-123," which corresponds to the specific UI page view schema in the specific UI page view metadata 156 in the UI page view metadata container 152. Then the log entry parser 304 determines whether the subtype schema identifier "schemaid-123" identifies a subtype schema in the specific UI error metadata 144 in the UI error metadata container 140, in the specific UI performance metadata 150 in the UI performance metadata container 146, in the specific UI page view metadata 156 in the UI page view metadata container 152, or in the specific UI interaction metadata 162 in the UI interaction metadata container 158. The log entry parser 304 provides the specific UI page view schema, identified by the schema identifier "schema-123," and the subtype data stored in the payload field, identified by the UI log entry, to the log subtype handler 306. Next the log subtype handler 306 uses the UI page view subtype schema from the specific UI page view metadata 156 in the UI page view metadata container 152 to determine a list of pair values of field locations and field types of the fields needed to be extracted, and provides the list of pair values of field locations and field types of the fields needed to be extracted and the subtype data stored in the payload field to the stream parser 308. The log subtype handler 306 takes subtype data and a subtype schema, and returns an ordered list of subtype field names defined in the subtype schema's name field and corresponding subtype field values extracted from the subtype data.

Once the corresponding schema is identified, log data is identified by using the corresponding schema to parse fields in the log entry, block 408. The system uses the identified schema to identify log data that is subsequently output from a log entry. For example and without limitation, this can include the stream parser 308 using list of pair values of field locations and field types of the fields needed to be extracted to parse subtype data stored in the payload field to identify log data that identifies the selected UI element and its timestamp. The stream parser 308 parses elements one-by-one in a depth first search manner, and extracts the element's values that are present in the list of paths, the field locations passed into the stream parser and representing the fields to extract from the subtype data, while ignoring the elements not present in the list. The stream parser 308 returns the log data to the log subtype handler 306, which returns the log data to the log entry parser 304, which returns the log data to the mapper 302, which writes the log data to an intermediate storage, which is accessed by the reducer 310 to retrieve the log data. The stream parser 308 only parses subtype data and extracts subtype fields once for a given subtype data, subtype path, and subtype field, no matter how many times the stream parser 308 is called. A subtype field can be an entity's subdivision of a record, and represent an item of data.

The stream parser 308 is a subtype parser that parses subtype data as a stream, instead of serializing subtype data into an object, due to the following reasons. Since the subtype data and the subtype schema are provided by an application whose developers can change the subtype data and the subtype schema at any time, maintaining class representations of multiple subtype schemas would not scale. If a new subtype schema was introduced and there is no matching class representation in place, the serialization of subtype data would result in errors. Since there are several subtype fields in the subtype data that the stream parser 308 does not need to extract, when the stream parser 308 encounters a field that does not need to be extracted, the stream parser 308 will skip this field and all other fields underneath this field, such that streaming significantly increases the performance of the stream parser 308. Since subtype data is defined by a subtype schema, instead of a representation of full subtype schema owned and created by another team, a subtype field may be a union of more than one primitive or complex field types. Therefore, not serializing subtype data to an object provides a system administrator the flexibility to devise an algorithm to parse these special field types that would not be available in serialization.

Following identification of the log data, the log data is output, block 410. The system outputs log data from a log entry. By way of example and without limitation, this can include the reducer 310 outputting the log data that identifies the selected UI element and its timestamp.

Fields are parsed in another log entry to identify another log code relating to a third log entry type, the other log code corresponding to another schema in a container for the third log entry type, the other log entry corresponding to another system user event, box 412. The system can still parse a log entry without subtype fields to identify log data that is subsequently output from the log entry. In embodiments, this can include the log entry parser 304 parsing a CRM log entry to identify a CRM log code that corresponds to a CRM schema stored as metadata in the CRM metadata 138 in the CRM metadata container 136. The CRM logger 114 created the CRM log entry when a system user initiated the CRM application 116.

After the other schema is identified, other log data is identified by applying the other schema to fields in the log entry, block 414. The system can still identify log data from a log entry without subtype fields, and subsequently outputs the log data from the log entry. For example and without limitation, this can include the log entry parser 304 parsing the CRM log entry using the CRM schema, stored as CRM metadata 138 in the CRM metadata container 136, to identify log data in the CRM log entry. Then the log entry parser 304 returns the other log data to the mapper 302, which writes the other log data to an intermediate storage, which is accessed by the reducer 310 to retrieve the other log data.

Following identification of the other log data, the other log field data is output, block 416. The system can still output log data from a log entry without subtype fields. By way of example and without limitation, this can include the reducer 310 outputting the log data that identifies the initiation of the CRM application by a system user, and the timestamp that identifies when the initiation occurred.

The method 400 may be repeated as desired. Although this disclosure describes the blocks 402-416 executing in a particular order, the blocks 402-416 may be executed in a different order. In other implementations, each of the blocks 402-416 may also be executed in combination with other blocks and/or some blocks may be divided into a different set of blocks.

System Overview

Figure 5:
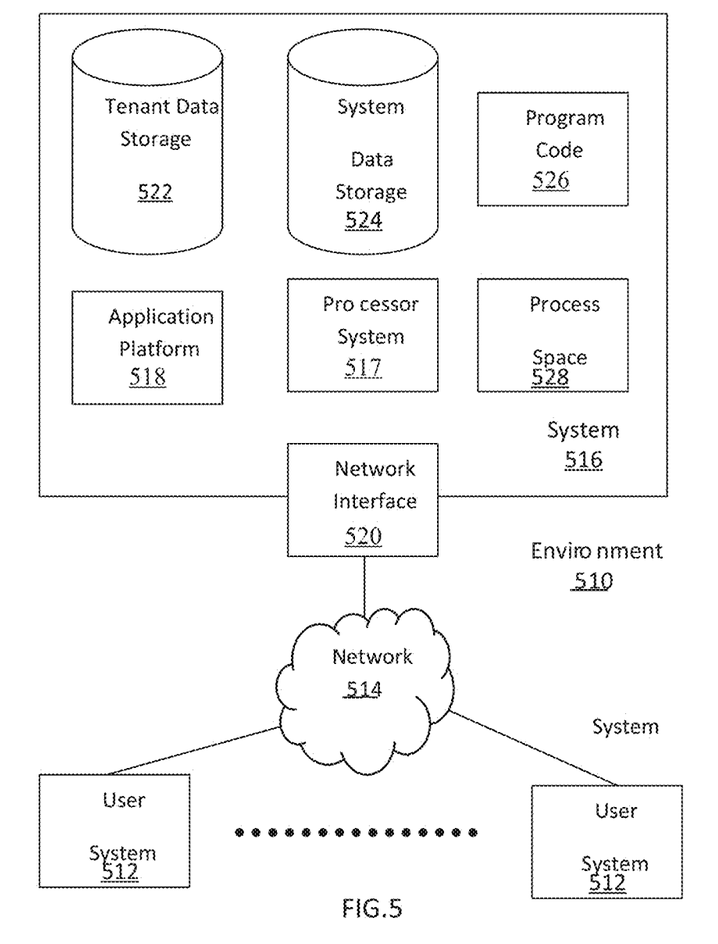
FIG. 5 illustrates a block diagram of an example of an environment wherein an on-demand database service might be used.

FIG. 5 illustrates a block diagram of an environment 510 wherein an on-demand database service might be used. The environment 510 may include user systems 512, a network 514, a system 516, a processor system 517, an application platform 518, a network interface 520, a tenant data storage 522, a system data storage 524, program code 526, and a process space 528. In other embodiments, the environment 510 may not have all of the components listed and/or may have other elements instead of, or in addition to, those listed above.

The environment 510 is an environment in which an on-demand database service exists. A user system 512 may be any machine or system that is used by a user to access a database user system. For example, any of the user systems 512 may be a handheld computing device, a mobile phone, a laptop computer, a work station, and/or a network of computing devices. As illustrated in FIG. 5 (and in more detail in FIG. 6) the user systems 512 might interact via the network 514 with an on-demand database service, which is the system 516.

An on-demand database service, such as the system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 516" and the "system 516" will be used interchangeably herein. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system.

In an embodiment, the on-demand database service 516 may include the application platform 518 which enables creation, managing and executing one or more applications developed by the provider of the on-demand database service, users accessing the on-demand database service via user systems 512, or third party application developers accessing the on-demand database service via the user systems 512.

The users of the user systems 512 may differ in their respective capacities, and the capacity of a particular user system 512 might be entirely determined by permissions (permission levels) for the current user. For example, where a salesperson is using a particular user system 512 to interact with the system 516, that user system 512 has the capacities allotted to that salesperson. However, while an administrator is using that user system 512 to interact with the system 516, that user system 512 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 512 might communicate with the system 516 using TCP/IP and, at a higher network level, use other common Internet protocols to communicate, such as HTTP, FTP, AFS, WAP, etc. In an example where HTTP is used, the user systems 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 516, shown in FIG. 5, implements a web-based customer relationship management (CRM) system. For example, in one embodiment, the system 516 includes application servers configured to implement and execute CRM software applications as well as provide related data, code, forms, webpages and other information to and from the user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 516 implements applications other than, or in addition to, a CRM application. For example, the system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of the system 516 is shown in FIG. 5, including the network interface 520, the application platform 518, the tenant data storage 522 for tenant data 523, the system data storage 524 for system data 525 accessible to the system 516 and possibly multiple tenants, the program code 526 for implementing various functions of the system 516, and the process space 528 for executing MTS system processes and tenant-specific processes, such as running applications as part of an application hosting service. Additional processes that may execute on the system 516 include database indexing processes.

Several elements in the system shown in FIG. 5 include conventional, well-known elements that are explained only briefly here. For example, each of the user systems 512 could include a desktop personal computer, workstation, laptop, PDA, cell phone, or any wireless access protocol (WAP) enabled device or any other computing device capable of interfacing directly or indirectly to the Internet or other network connection. Each of the user systems 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 512 to access, process and view information, pages and applications available to it from the system 516 over the network 514. Each of the user systems 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 516 or other systems or servers. For example, the user interface device may be used to access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 512 and all of its components are operator configurable using applications, such as a browser, including computer code run using a central processing unit such as an Intel Pentium® processor or the like. Similarly, the system 516 (and additional instances of an MTS, where more than one is present) and all of their components might be operator configurable using application(s) including computer code to run using a central processing unit such as the processor system 517, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 516 is configured to provide webpages, forms, applications, data and media content to the user (client) systems 512 to support the access by the user systems 512 as tenants of the system 516. As such, the system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 6:
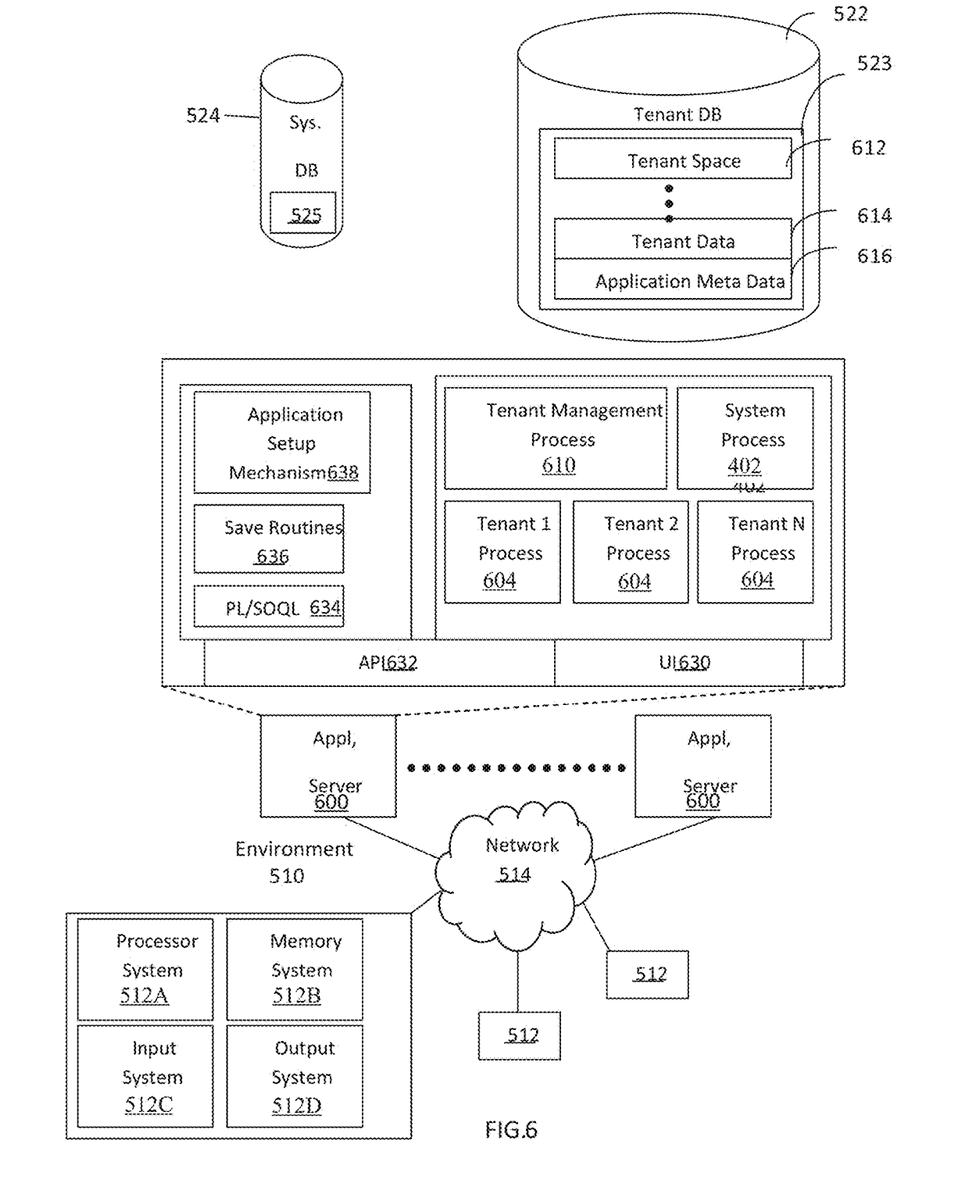
FIG. 6 illustrates a block diagram of an embodiment of elements of FIG. 5 and various possible interconnections between these elements.

FIG. 6 also illustrates the environment 510. However, in FIG. 6 elements of the system 516 and various interconnections in an embodiment are further illustrated. FIG. 6 shows that the each of the user systems 512 may include a processor system 512A, a memory system 512B, an input system 512C, and an output system 512D. FIG. 6 shows the network 514 and the system 516. FIG. 6 also shows that the system 516 may include the tenant data storage 522, the tenant data 523, the system data storage 524, the system data 525, a User Interface (UI) 630, an Application Program Interface (API) 632, a PL/SOQL 634, save routines 636, an application setup mechanism 638, applications servers $600_1$-$600_N$, a system process space 602, tenant process spaces 604, a tenant management process space 610, a tenant storage area 612, a user storage 614, and application metadata 616. In other embodiments, the environment 510 may not have the same elements as those listed above and/or may have other elements instead of, or in addition to, those listed above.

The user systems 512, the network 514, the system 516, the tenant data storage 522, and the system data storage 524 were discussed above in FIG. 5. Regarding the user systems 512, the processor system 512A may be any combination of one or more processors. The memory system 512B may be any combination of one or more memory devices, short term, and/or long term memory. The input system 512C may be any combination of input devices, such as one or more keyboards, mice, trackballs, scanners, cameras, and/or interfaces to networks. The output system 512D may be any combination of output devices, such as one or more monitors, printers, and/or interfaces to networks. As shown by FIG. 6, the system 516 may include the network interface 520 (of FIG. 5) implemented as a set of HTTP application servers 600, the application platform 518, the tenant data storage 522, and the system data storage 524. Also shown is the system process space 602, including individual tenant process spaces 604 and the tenant management process space 610. Each application server 600 may be configured to access tenant data storage 522 and the tenant data 523 therein, and the system data storage 524 and the system data 525 therein to serve requests of the user systems 512. The tenant data 523 might be divided into individual tenant storage areas 612, which may be either a physical arrangement and/or a logical arrangement of data. Within each tenant storage area 612, the user storage 614 and the application metadata 616 might be similarly allocated for each user. For example, a copy of a user's most recently used (MRU) items might be stored to the user storage 614. Similarly, a copy of MRU items for an entire organization that is a tenant might be stored to the tenant storage area 612. The UI 630 provides a user interface and the API 632 provides an application programmer interface to the system 516 resident processes to users and/or developers at the user systems 512. The tenant data and the system data may be stored in various databases, such as one or more Oracle™ databases.

The application platform 518 includes the application setup mechanism 638 that supports application developers' creation and management of applications, which may be saved as metadata into the tenant data storage 522 by the save routines 636 for execution by subscribers as one or more tenant process spaces 604 managed by the tenant management process 610 for example. Invocations to such applications may be coded using the PL/SOQL 634 that provides a programming language style interface extension to the API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATA- BASE SERVICE, by Craig Weissman, filed Sep. 21, 2007, which is incorporated in its entirety herein for all purposes. Invocations to applications may be detected by one or more system processes, which manages retrieving the application metadata 616 for the subscriber making the invocation and executing the metadata as an application in a virtual machine.

Each application server 600 may be communicably coupled to database systems, e.g., having access to the system data 525 and the tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also may be used. For example, in certain embodiments, three consecutive requests from the same user could hit three different application servers 600, and three requests from different users could hit the same application server 600. In this manner, the system 516 is multi-tenant, wherein the system 516 handles storage of, and access to, different objects, data and applications across disparate users and organizations.

As an example of storage, one tenant might be a company that employs a sales force where each salesperson uses the system 516 to manage their sales process. Thus, a user might maintain contact data, leads data, customer follow-up data, performance data, goals and progress data, etc., all applicable to that user's personal sales process (e.g., in the tenant data storage 522). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 516 might also maintain system level data usable by multiple tenants or other data. Such system level data might include industry reports, news, postings, and the like that are sharable among tenants.

In certain embodiments, the user systems 512 (which may be client systems) communicate with the application servers 600 to request and update system-level and tenant-level data from the system 516 that may require sending one or more queries to the tenant data storage 522 and/or the system data storage 524. The system 516 (e.g., an application server 600 in the system 516) automatically generates one or more SQL statements (e.g., one or more SQL queries) that are designed to access the desired information. The system data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for parsing complex log entry types, the system comprising:
one or more processors; and
a non-transitory computer readable medium storing a plurality of instructions, which when executed, cause the one or more processors to:
parse, by a computing system, fields in a log entry to identify a log code relating to a first log entry type and a second log entry type, the log entry corresponding to a system user event;
identify, by the computing system, a common schema for the first log entry type and the second log entry type;
identify, by the computing system, a schema identifier by applying the common schema to the log entry, the schema identifier corresponding to a schema in one of a container for the first log entry type and a container for the second log entry type, the first log entry type container comprising the common schema and a first schema specific to the first log entry type, the second log entry type container comprising the common schema and a second schema specific to the second log entry type;
identify, by the computing system, log data by using the corresponding schema to parse fields in the log entry; and
cause, by the computing system, the log data to be outputted.

2. The system of claim 1, wherein the common schema comprises the log code, identifies a field containing payload data, and identifies a field used for identifying the corresponding schema.

3. The system of claim 1, wherein the first schema and the second schema are based on corresponding subtype schemas in hierarchical formats.

4. The system of claim 1, wherein the first schema identifies a first field name, a first field type, and a first field location, and the second schema identifies a second field name, a second field type, and a second field location.

5. The system of claim 1, wherein at least one of the first schema, the second schema, the common schema, the container for the first log entry type, and the container for the second log entry type identify a release version of an application associated with the system user event.

6. The system of claim 1, wherein the log data to be outputted corresponds to a log field approved for being accessed by an end user of a multi-tenant system, the end user being associated with a tenant of a plurality of tenants of the multi-tenant system.

7. The system of claim 1, comprising further instructions, which when executed, cause the one or more processors to:
parse, by the computing system, fields in another log entry to identify another log code relating to a third log entry type, the other log code corresponding to another schema in a container for the third log entry type, the other log entry corresponding to another system user event;
identify, by the computing system, other log data by applying the other schema to the fields in the log entry; and
cause, by the computing system, the other log data to be outputted.

8. A computer program product comprising computer-readable program code to be executed by one or more processors when retrieved from a non-transitory computer-readable medium, the program code including instructions to:
parse, by a computing system, fields in a log entry to identify a log code relating to a first log entry type and a second log entry type, the log entry corresponding to a system user event;
identify, by the computing system, a common schema for the first log entry type and the second log entry type;
identify, by the computing system, a schema identifier by applying the common schema to the log entry, the schema identifier corresponding to a schema in one of a container for the first log entry type and a container for the second log entry type, the first log entry type container comprising the common schema and a first schema specific to the first log entry type, the second log entry type container comprising the common schema and a second schema specific to the second log entry type;
identify, by the computing system, log data by using the corresponding schema to parse fields in the log entry; and
cause, by the computing system, the log data to be outputted.

9. The computer program product of claim 8, wherein the common schema comprises the log code, identifies a field containing payload data, and identifies a field used for identifying the corresponding schema.

10. The computer program product of claim 8, wherein the first schema and the second schema are based on corresponding subtype schemas in hierarchical formats.

11. The computer program product of claim 8, wherein the first schema identifies a first field name, a first field type, and a first field location, and the second schema identifies a second field name, a second field type, and a second field location.

12. The computer program product of claim 8, wherein at least one of the first schema, the second schema, the common schema, the container for the first log entry type, and the container for the second log entry type identify a release version of an application associated with the system user event.

13. The computer program product of claim 8, wherein the log data to be outputted corresponds to a log field approved for being accessed by an end user of a multi-tenant system, the end user being associated with a tenant of a plurality of tenants of the multi-tenant system.

14. The computer program product of claim 8, wherein the program code comprises further instructions to:
parse, by the computing system, fields in another log entry to identify another log code relating to a third log entry type, the other log code corresponding to another schema in a container for the third log entry type, the other log entry corresponding to another system user event;
identify, by the computing system, other log data by applying the other schema to the fields in the log entry; and
cause, by the computing system, the other log data to be outputted.

15. A method comprising:
parsing, by a computing system, fields in a log entry to identify a log code relating to a first log entry type and a second log entry type, the log entry corresponding to a system user event;
identifying, by the computing system, a common schema for the first log entry type and the second log entry type;

identifying, by the computing system, a schema identifier by applying the common schema to the log entry, the schema identifier corresponding to a schema in one of a container for the first log entry type and a container for the second log entry type, the first log entry type container comprising the common schema and a first schema specific to the first log entry type, the second log entry type container comprising the common schema and a second schema specific to the second log entry type;

identifying, by the computing system, log data by using the corresponding schema to parse fields in the log entry; and causing, by the computing system, the log data to be outputted.

16. The method of claim 15, wherein the common schema comprises the log code, identifies a field containing payload data, and identifies a field used for identifying the corresponding schema.

17. The method of claim 15, wherein the first schema and the second schema are based on corresponding subtype schemas in hierarchical formats, and wherein the first schema identifies a first field name, a first field type, and a first field location, and the second schema identifies a second field name, a second field type, and a second field location.

18. The method of claim 15, wherein at least one of the first schema, the second schema, the common schema, the container for the first log entry type, and the container for the second log entry type identify a release version of an application associated with the system user event.

19. The method of claim 15, wherein the log data to be outputted corresponds to a log field approved for being accessed by an end user of a multi-tenant system, the end user being associated with a tenant of a plurality of tenants of the multi-tenant system.

20. The method of claim 15, wherein the method further comprises:

parsing, by the computing system, fields in another log entry to identify another log code relating to a third log entry type, the other log code corresponding to another schema in a container for the third log entry type, the other log entry corresponding to another system user event;

identifying, by the computing system, other log data by applying the other schema to the fields in the log entry; and causing, by the computing system, the other log data to be outputted.

* * * * *